United States Patent [19]

Schiffauer et al.

[11] Patent Number: 4,957,944

[45] Date of Patent: Sep. 18, 1990

[54] URETHANE CATALYSTS

[75] Inventors: Reinhart Schiffauer, Cross Lanes, W. Va.; Walter Buchmuller, Gutenburg, Switzerland

[73] Assignee: Union Carbide Chemicals and Plastics Company Inc., Danbury, Conn.

[21] Appl. No.: 367,266

[22] Filed: Jun. 16, 1989

[51] Int. Cl.⁵ ............................................. C08G 18/14
[52] U.S. Cl. ................................. 521/115; 521/126; 521/127; 521/167
[58] Field of Search ............... 521/115, 126, 127, 167

[56] References Cited

U.S. PATENT DOCUMENTS

| | | | |
|---|---|---|---|
| 2,602,819 | 6/1952 | Huscher et al. | 564/415 |
| 2,697,118 | 2/1954 | Lundsted et al. | 260/584 |
| 2,941,967 | 5/1960 | Moller et al. | 521/115 |
| 3,125,540 | 3/1964 | Loew et al. | 521/76 |
| 3,127,436 | 6/1964 | Flynn et al. | 260/465.5 |
| 3,210,300 | 1/1965 | Leibu et al. | 260/2.5 |
| 3,243,389 | 1/1966 | Moller et al. | 521/115 |
| 3,330,782 | 7/1967 | Poppelsdorf | 528/53 |
| 3,331,791 | 7/1967 | Cuscurida | 260/2.5 |
| 3,364,239 | 1/1968 | Speranza | 564/508 |
| 3,383,351 | 5/1968 | Stamberger | 260/33.2 |
| 3,404,105 | 10/1968 | Rossmy | 260/2.5 |
| 3,428,683 | 2/1969 | Swenson et al. | 564/475 |
| 3,454,504 | 4/1969 | Murai et al. | 260/2.5 |
| 3,476,933 | 6/1969 | Mendelsohn | 260/2.5 |
| 3,480,675 | 11/1969 | Poppelsdorf | 260/584 |
| 3,622,542 | 3/1971 | Klouman et al. | 521/160 |
| 3,632,707 | 1/1972 | Rice | 521/160 |
| 3,645,925 | 2/1972 | Speranza et al. | 521/115 |
| 3,660,319 | 2/1972 | Yeakey | 564/505 |
| 3,669,913 | 6/1972 | Morehouse | 260/2.5 |
| 3,697,458 | 6/1972 | Burba et al. | 521/167 |
| 3,748,288 | 1/1973 | Winkler et al. | 260/2.5 |
| 3,783,133 | 1/1974 | Speranza | 521/159 |
| 3,786,029 | 1/1974 | Bechara | 564/505 |
| 3,793,237 | 2/1974 | Watkinson | 260/2.5 |
| 3,832,402 | 9/1974 | Yeakey | 564/504 |
| 3,847,992 | 9/1974 | Moss | 564/505 |
| 3,891,709 | 6/1975 | Higuchi et al. | 260/2.5 |
| 3,920,587 | 8/1975 | Watkinson | 260/2.5 |
| 3,925,268 | 8/1975 | Rosemund et al. | 260/2.5 |
| 3,928,257 | 8/1975 | Fuzesi et al. | 521/131 |
| 3,928,258 | 8/1975 | Alexander | 521/131 |
| 4,003,847 | 6/1977 | Prokai | 252/350 |
| 4,101,466 | 6/1978 | McEntire | 528/49 |
| 4,101,470 | 6/1978 | McEntire | 528/49 |
| 4,140,667 | 2/1979 | Preston et al. | 521/137 |
| 4,190,417 | 1/1980 | Prochaska et al. | 8/2.5 |
| 4,288,566 | 5/1981 | Muller et al. | 521/158 |
| 4,304,872 | 8/1981 | Tenhagen | 521/52 |
| 4,419,461 | 7/1983 | Arbir et al. | 521/126 |
| 4,421,869 | 7/1983 | Arbir et al. | 521/126 |
| 4,495,081 | 4/1985 | Vanderhider et al. | 521/159 |
| 4,582,938 | 1/1986 | Harwell | 564/508 |

FOREIGN PATENT DOCUMENTS 1028810 2/1968 United Kingdom .

*Primary Examiner*—Maurice J. Welsh
*Attorney, Agent, or Firm*—Paul W. Leuzzi

[57] ABSTRACT

Certain dimethylamino alkyleneoxy isopropanols obtained by propoxylation of dimethylamino alkanols and ethers is used as a catalyst for preparing polyurethane foam.

30 Claims, No Drawings

URETHANE CATALYSTS

BACKGROUND OF THE INVENTION

1. Field of the Invention

This invention pertains to the field of urethane catalysts. More particularly, this invention relates to the use of certain dimethylamino polyalkyleneoxy isopropanols as catalysts for preparing polyurethane foam.

2. Description of Related Art

The use of a catalyst when preparing polyurethanes by reacting a polyisocyanate with an active hydrogen-containing compound, as measured by the Zerewitinoff method, such as a polyol, and other optional ingredients, is known. Catalysts are employed to promote at least two, and generally three, major reactions. These reactions must proceed simultaneously and at competitively balanced rates during the process in order to yield a polyurethane with desired physical characteristics.

One reaction is a chain extending isocyanate-hydroxyl reaction by which a hydroxyl-containing molecule is reacted with an isocyanate-containing molecule to form the urethane. The progress of this reaction increases the viscosity of the mixture and forms a polyurethane containing a secondary nitrogen atom in the urethane groups.

A second reaction is a cross-linking isocyanate-urethane reaction wherein an isocyanate-containing molecule reacts with the secondary nitrogen atom of the urethane group. The third reaction, which often is important, particularly when the preparation of flexible polyurethane foam is desired, comprises an isocyanate-water reaction wherein an isocyanate-terminated molecule is extended and by which carbon dioxide is generated to "blow" or assist in the "blowing" of the foam. The in-situ generation of carbon dioxide by this reaction plays an essential part in the preparation of "one-shot" flexible polyurethane foams.

In order to obtain a good urethane foam structure, these reactions must proceed simultaneously at optimum balanced rates relative to each other. For example, if the carbon dioxide evolution is too rapid in comparison with the chain extension reaction, the foam tends to collapse. Alternatively, if the chain extension reaction is too rapid in comparison with the reaction that generates carbon dioxide, foam rise will be restricted, thus resulting in a high-density foam with a high percentage of poorly defined cells. Finally, if crosslinking reactions, including the second reaction, do not keep pace with the first or third reactions, the foam may not be stable because of the absence of adequate cross-linking.

It has long been known that tertiary amines, such as trimethylamine, triethylamine, tetramethylpropanediamine, triethylenediamine, dimethylethanolamine, methyltriethylenediamine, N-methylmorpholine, N-ethylmorpholine and the like are effective for catalyzing the cross-linking isocyanate-urethane reaction. Many of the tertiary amines also are effective for catalyzing the water-isocyanate reaction that causes carbon dioxide evolution. A variety of tertiary amine catalysts are disclosed in U.S. Pat. Nos. 3,476,933, 3,925,268, 3,127,436 and 3,243,389.

However, tertiary amines are only partially effective as catalysts for the chain extension reaction and thus normally are used in combination with other catalysts, typically an organic tin catalyst. For example, in the preparation of flexible foams, a one-step or "one-shot" process has long been used wherein triethylenediamine is employed for promoting the water-isocyanate reaction and the crosslinking reaction; while an organic tin compound is used in synergistic combination with the triethylenediamine to promote the chain extension reaction.

One problem with triethylenediamine and other similar materials is that they are solids and must be dissolved prior to use to avoid processing difficulties such as non-homogeneous reactions. Also, triethylenediamine and many of the other prior art amines impart a strong amine odor to the polyurethane foam. In addition to odor and handling problems, certain other tertiary amines are very high in relative volatility and present significant safety and toxicity problems.

U.S. Pat. No. 2,941,967 discloses a process for catalytically enhancing the reaction of an isocyanate with a polyol by including mono and diamino ethers, e.g., dimethyl-(2-methoxyethyl)-amine and bis-(3-dimethylaminopropyl)ether as a catalytic component.

U.S. Pat. Nos. 3,330,782 and 3,480,675 disclose using tertiary amine ethers as catalysts for the reaction of organic polyisocyanates with active hydrogen-containing compounds. In the '782 patent, beta-(N,N-dimethylamino) alkyl ethers are used as catalysts for the urethane reaction.

U.S. Pat. No. 3,622,542 and U.S. Pat. No. 4,495,081 disclose using N,N'-tetramethyl-2-hydroxy-1,3-diaminopropane as a catalyst for preparing polyurethane foams.

U.S. Pat. No. 3,632,707 uses a mixture of trimethylaminoethylpiperazine and dimethylamino ethanol as a catalyst for preparing flexible polyurethane foam from a polyether polyol using the "one shot" process.

U.S. Pat. No. 3,645,925 discloses an amine catalyst for a polyurethane reaction consisting of a 4,4'-dimorpholinodiethyl ether. Its use in combination with other tertiary amines also is disclosed.

U.S. Pat. No. 3,786,029 describes using amino-orthoesters, prepared by reacting amino alkanols, such as 1-methyl-2-(N,N-dimethylaminoethoxy) ethanol, with an orthoester, as catalysts for polyurethane formation.

U.S. Pat. Nos. 4,410,466 and 4,101,470 describe certain bis(dimethylaminopropyl)-amine derivatives which include ethers and alcohol-terminated compounds. These components are alleged to have catalytic activity for urethane synthesis.

U.S. Pat. Nos. 4,419,461 and 4,421,869 disclose using the combination (i.e. a partial salt) of 3-dimethylaminopropylamine and either a branched octanoic acid or phenol as a catalyst for preparing polyurethane foam.

U.S. Pat. No. 4,582,938 also relates to certain bis(-dialkylaminoethyl) polyamine ethers useful as catalysts for urethane synthesis.

Included among the above catalysts useful for urethane synthesis are tertiary amines having active hydrogens, which thus are reactive with isocyanate groups. Such tertiary amines include triethanolamine; triisopropanolamine; N-methyldiethanolamine; N-ethyldiethanolamine; N,N-dimethylethanolamine and their reaction products with alkylene oxides such as propylene oxide and/or ethylene oxide. See, for example, U.S. Pat. Nos. 3,669,913; 3,793,237; 4,190,417 and 4,304,872.

Polyamines also have been used as the active hydrogen-containing reactant for preparing polyurethanes. U.S. Pat. No. 2,697,118 describes using N,N,N',N'-tetrakis-(2-hydroxypropyl)-ethylene diamine. U.S. Pat.

No. 3,697,458 uses the propoxylated adduct of the reaction product of a dialkanolamine and an epihalohydrin. U.S. Pat. No. 3,330,782 discloses using the alkylene oxide adducts of trialkanolamines. U.S. Pat. No. 3,847,992 uses partially aminated polyoxyalkylene polyols containing primary hydroxyl groups and possibly some terminal secondary hydroxyl groups. See also U.S. Pat. Nos. 3,125,540; 3,383,351 and 3,404,105 and G.B. Patent No. 1,028,810.

DESCRIPTION OF THE INVENTION

The present invention is directed to a particular class of reactive polyurethane catalysts which exhibit an excellent balance between their promotion of the isocyanate-water reaction and their own reactivity with isocyanates. The catalysts of the invention primarily catalyze the reaction between isocyanate and water. Their reactivity with isocyanates is low enough that the catalysts are not consumed until substantially all of the water has been reacted with isocyanate for foaming the polyurethane. Thus, the catalysts of the present invention are able to satisfy their primary function, i.e., catalyzing the isocyanate-water reaction, and still react into the urethane molecule to reduce amine-odor problems.

The reactive dimethylamino polyalkyleneoxy isopropanol catalysts of this invention have the following structural formula:

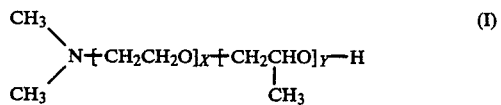

where X is at least 1 and Y is at least 1. Preferably, X is 1 to 5 and/or Y is 1 to 5, more preferably X is 1 to 3 and Y is 1 to 2, most preferably X is 1 to 2 and Y is 1.

These compounds may be prepared using a wide variety of known synthetic techniques. For example, the reactive polyurethane catalysts of this invention can be prepared by reacting dimethylethanolamine (DMEA) or an ethylene oxide adduct of dimethylethanolamine with propylene oxide. Suitable reactive polyurethane catalysts according to the present invention also can be prepared by reacting bis-2-(N,N'-dimethylamino) ethyl ether (DMEE) with propylene oxide. Reaction of an olefin oxide such as propylene oxide with a hydroxy-containing or amine-containing reactant as required for producing the above catalysts, are well known to those skilled in the art. Such reactions often are carried out under basic conditions using alkali metal hydroxides, oxides and hydrides and in some cases basic amines. Because one of the reactants is an amine, there may be no need to add additional alkali. The molar amounts of ethylene oxide and/or propylene oxide relative to the amine starting material, e.g., DMEA, are selected to provide the desired level of ethyleneoxy units and propyleneoxy units in the catalyst compound.

In order to facilitate recovery and purification of the catalytic compound, e.g. by distillation, it is helpful to limit the length of the alkyleneoxy sub-units. Thus, it is preferred that the catalyst have no more than about five mols of ethyleneoxy or propyleneoxy per mol of amine. Most preferably, the catalyst has one or two ethyleneoxy units and one propyleneoxy unit.

Two characteristic features of the catalysts of this invention are the presence of a terminal secondary hydroxyl group together with a dimethylamino-ethyleneoxy molecular sequence. It is this combination of structures which is believed to provide the catalysts of this invention with their unique combination of good catalytic activity with a suitably low level of reactivity.

Although not wishing to be bound to any particular theory, it is believed that aminoalcohols having primary hydroxyl groups are less effective as catalysts than the compounds of the present invention due to their higher level of reactivity with the isocyanates; while other aminoalcohols than those specifically disclosed herein but also having secondary alcohols are believed to be less effective as catalysts because they lack the dimethylamino-ethyleneoxy molecular sequence of the compounds of the present invention.

Because of their reduced reactivity, the catalysts of the present invention also can be expected to contribute to small improvements in foam properties. The low reactivity prevents these catalysts from interfering, to any significant extent, with the desired isocyanate-polyol chain extending reactions and the cross-linking reactions. Thus, these catalysts do not disturb the desired sequence of polymer growth by undesired competition reactions.

To prepare polyurethanes using the catalysts of the present invention, any polyisocyanate, generally an aromatic polyisocyanate, can be used. Suitable aromatic polyisocyanates include: m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate.

Most preferred aromatic polyisocyanates are 2,4 and 2,6 tolylene diisocyanates and their mixtures and methylene-bridged polyphenyl polyisocyanate mixtures which have a functionality of from about 2 to about 4. Known processes for preparing such methylene-bridged polyphenyl polyisocyanates are described, for example, in U.S. Pat. Nos. 2,683,730; 2,950,263; 3,012,008; 3,344,162 and 3,362,979.

The hydroxyl-containing polyol component, i.e. the active hydrogen-containing compound, which reacts with the isocyanate may suitably be a polyester polyol or a polyether polyol having a functionality of at least about 2 and a hydroxyl number ranging from about 700 or higher to about 25, or lower. When it is desired to provide a flexible foam, the hydroxyl number is preferably in the range of from about 25 to 100. For rigid foams, the hydroxyl number is preferably in the range of from about 350 to 700. Semi-rigid foams of a desired flexibility are provided when the hydroxyl number is intermediate to the ranges just given. The catalysts of the present invention have particular utility for preparing flexible urethane foams from polyols containing predominantly, and preferably only, primary hydroxyls.

Hydroxyl number is defined as the number of milligrams of potassium hydroxide required for the complete hydrolysis of the fully acetylated derivative prepared from one gram of polyol. The hydroxyl number also is defined by the equation;

$$OH = \frac{56.1 \times 1000 \times f}{M.W.}$$

where OH equals the hydroxy number of the polyol; f equals the functionality of the polyol (i.e., the average number of hydroxyl groups per molecule of polyol); and M.W. equals the molecular weight (e.g. number average) of the polyol.

When the polyol is a polyester, it is preferred to use, a polyester resin having a relatively high hydroxyl value and a relatively low acid value made from the reaction of a polycarboxylic acid with a polyhydric alcohol. When a flexible urethane foam is desired, the polyester polyol should generally have an average functionality (i.e., the number of active hydrogens per molecule) of from about 2 to about 4 and a molecular weight of from about 2,000 to about 4,000. For rigid foams, the functionality of the polyester polyol component is normally from about 4 to about 7.

When the hydroxyl-containing component is a polyether polyol for use in flexible polyurethane foam, the polyol may be an alkylene oxide adduct of a polyhydric alcohol with a functionality of from about 2 to about 4. The polyester polyol will suitably have a molecular weight within the range of from about 2000 to about 7000. For flexible polyether polyurethane foams, the alkylene oxide is preferably propylene oxide or a mixture of propylene oxide and ethylene oxide.

For rigid polyether polyurethane foams, the polyol should typically have a functionality of from about 4 to about 7 and a molecular weight of from about 300 to about 1200. Polyols for rigid polyether polyurethane foams may be made in various ways including the addition of an alkylene oxide, as above, to a polyhydric alcohol with a functionality of from 4 to 7.

Also suitable as the active hydrogen-containing component are the so-called "polymer/polyols or graft polyols, such as those obtained by polymerizing ethyleneically unsaturated monomers in a suitable liquid polyol in the presence of a free radical catalyst. Reactants, reaction conditions and proportions for preparing such polymer/polyols are well-known to those skilled in the art. Suitable monomers for producing these polymer/polyols include for example, acrylonitrile, vinyl chloride, styrene, butadiene, vinylidine chloride and the like. Copolymers of acrylonitrile and styrene are particularly preferred.

Polyols suitable for producing the polymer/polymers include polyhydroxyalkanes; the polyoxyalkylene polyols and the like. As above, polyols employed for making polymer/polyols useful in the present invention may have a wide range of hydroxyl numbers. Generally, the hydroxyl numbers of the polyols used to prepare the polymer/polyols range from about 20 and lower to about 200 and higher, and preferably range from about 25 to about 150.

A more comprehensive discussion of polymer/polyols can be found inter alia in the Stanberger patents, U.S. Pat. Nos. 3,304,273; 3,383,351; and Reissue No. 28,715 (reissue of U.S. Pat. No. 3,383,351); the Stanberger British Patent No. 1,022,434; U.S. Pat. Nos. 3,652,639 and 3,823,201; U.S. Pat. No. 3,953,393; U.S. Pat. Nos. 4,119,586 and 4,148,840; and U.S. Pat. No. 4,282,331.

The amount of hydroxyl-containing polyol, i.e., active hydrogen compound, to be used relative to the isocyanate compound in both polyester-based and polyether-based polyurethane foams normally should be an amount such that the isocyanate groups are present in at least a molar equivalent amount, and preferably, in slight excess, compared with the free hydroxyl groups of the polyol. Preferably, the ingredients will be proportioned so as to provide from about 1.05 to about 1.5 mol equivalents of isocyanate groups per mol equivalent of hydroxyl groups. Normally, an amount of isocyanate is used to provide an isocyanate index in the range of above about 95 to 135, more usually about 100 to 120, wherein the isocyanate index is the percentage of the calculated stoichiometric amount of polyisocyanate needed to react with all of the active hydrogen-containing components in the formulation. For example, an isocyanate index of 110 indicates that 110% of the stoichiometric amount of the polyisocyanate needed to react with all active hydrogens in the formulation is used.

Water generally is used in an amount, based on the molar amount of the hydroxyl groups of the polyol compounds, within the range of from about 0.02 mol to below about 5.0 mols per mol equivalent of hydroxyl. Preferably between about 0.2 to 3.3 mols of water per mol of hydroxyl is used. Stated alternatively, between about 0.3 and 6.0 parts of water per hundred parts of the polyol normally are used when preparing flexible foam.

It also is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. Selection of a proper blowing agent is well within the knowledge of those skilled in the art.

The catalysts of the present invention are useful in the preparation of rigid, semi-rigid or flexible polyester or polyether polyurethane foams. The catalysts have particular suitability for preparing flexible foams, especially using the one-shot technique well-known to those skilled in the art. Based on the combined weight of the hydroxyl-containing compound and the polyisocyanate, these catalysts are employed in an amount of from about 0.01 to about 10.0 weight percent. More generally, the amount of catalyst used is about 0.05 to 5.0 weight percent of the combined polyurethane reactants, and usually between about 0.1 to 1.0 weight percent.

The catalysts of this invention may be used either alone or in mixture with one or more other catalysts such as organic tin compounds or other polyurethane catalysts, such as other amine catalysts. The organic tin compounds particularly useful in making flexible foams from polyether feedstocks include stannous or stannic compounds, such as a stannous salt of a carboxylic acid, i.e., a stannous acylate; a trialkyltin oxide; a dialkyltin dihalide; a dialkyltin oxide, and the like, wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Such co-catalysts are used in their conventional amounts.

Additional conventional polyurethane formulation ingredients also can be employed, such as, for example, foam stabilizers also known as silicone oils or emulsifiers. A wide variety of silicon-based surfactants are known in the art. For example, the foam stabilizer may be an organic silane or siloxane. See, for example, U.S. Pat. No. 3,194,773. Still other, additional ingredients that can be employed in the polyurethane formulation include dyes, pigments, fire retardants, anti-microbial agents and the like. Such ingredients are employed in preparing a polyurethane foam in their conventional minor amounts.

In preparing a flexible foam, the ingredients may be simultaneously, intimately mixed with each other by the so-called "one-shot" method to provide a foam by a one-step process. In the "one-shot" process, the polyol and polyisocyanate reactants, the catalysts, blowing agents, surfactants and other optional ingredients are mixed together in a conventional mixing head and the resulting mixture is dispensed into a mold. Usually, the foam is prepared as slab stock wherein the foaming mixture is discharged from the mixing head onto a continuously moving, generally open-topped and open-ended conveyor-type mold. As the conveyor advances, foam reactions cause the foam to expand upwardly. In this instance, water should comprise at least a part (e.g., 10 to 100%) of the blowing agent. The foregoing methods are well known to those skilled in the art.

When it is desired to prepare rigid foams, either the "one-shot" method or the so-called "quasi-prepolymer method" can be employed. In accordance with the "quasi-prepolymer method," a portion of the hydroxyl-containing component is reacted in the absence of a catalyst with the polyisocyanate component in proportions so as to provide from about 20 percent to about 40 percent of free isocyanate groups in the reaction product, based on the polyol. To prepare a foam, the remaining portion of the polyol is added and the two components are allowed to react in the presence of the catalytic system, such as those discussed above, and other appropriate additives.

The following examples are presented to illustrate and not limit the invention. Unless otherwise indicated, all parts and percentages are on a weight basis, and all temperatures are on the Centigrade scale.

EXAMPLE 1

This example illustrates a method for preparing catalysts of the present invention. To a 4-neck flask equipped with a stirrer, a condenser, a metering funnel, and an inlet for nitrogen, about 100 milliliters of either DMEA or DMEE are added. The reaction flask is purged and blanketed with nitrogen. Thereafter, about 20 mol percent of the stoichiometrically required amount of propylene oxide to yield one mole of propylene oxide per mole of dimethylamino reactant is added to the reaction flask through the metering funnel. The reaction mixture is heated to about 90° C. with stirring under the nitrogen atmosphere.

The heating bath then is removed and the remaining stoichiometric requirement of propylene oxide is slowly added at a rate to maintain a constant temperature. Once all of the propylene oxide is added to the reaction flask, any residual propylene oxide is consumed by increasing the temperature to about 125° C. for about 15 minutes. The reaction mixture then is fractionated by distillation under a vacuum and several distillate fractions are recovered. Each of the distillates is analyzed using gas chromatography for purity. Fractions containing more than about 98% of the desired catalyst (i.e., the catalysts of formula (I) wherein X is 1 or 2 and Y is 1) are retained for polyurethane synthesis. The catalysts can be used for making polyurethane foam from either ether polyol or ester polyol reactants.

EXAMPLE 2

A series of polyurethanes were prepared from an ether polyol (Polyurax 10.01 available from BP Chemicals) and TDI 80 (tolylene diisocyanate available from Bayer, A. G.) and water. Based on 100 parts by weight of the ether, 107 (index) isocyanate, 4.5 parts water and 1.4 parts of a siloxane surfactant (SC-162 available from BP Chemicals) were used. A catalyst system comprising a combination of stannous octoate and an amine was used. Polyurethane foam was prepared using each amine at three different levels of addition; and at each amine level three different stannous octoate levels of addition were used. Thus, for each catalyst pair nine different catalyst concentrations were examined.

The cream time and rise time of the various formulations were measured and the density, air flow (porosity) and hardness at 40% compression were measured for each of the resulting foams. The results are presented in the Table below. As used herein, cream time is the elapsed time from the mixing of the polyisocyanate (TDI) with the other ingredients until a noticeable expansion of the foam mixture occurs. Rise time is the elapsed time from the mixing of the polyisocyanate (TDI) with the other ingredients until a visible blow-off of gas occurs at near full rise of the foam.

The DMEA-propylene oxide adduct (using equal molar amounts of the reactants) made in accordance with Example 1 is designated DMEA-PO; while the DMEE-propylene oxide adduct (using equal molar amounts of the reactants) made in accordance with Example 1 is designated DMEE-PO.

TABLE 1

| AMINE TYPE | AMINE AMOUNT (pbw) | STANNOUS OCTOATE (pbw) | PREMIX TEMP. (°C.) | ATMOSPHERIC PRESSURE (mbar) | ABS. HUM. (mmHg) | CREAM TIME (SEC) | RISE TIME (SEC) | FOAM DENSITY (kg/m$^3$) | Air-flow (scFm) | HARDNESS 40% COMPRESSION (k Pa) |
|---|---|---|---|---|---|---|---|---|---|---|
| DMEA-PO | 0.192 | 0.160 | 22.8 | 1026 | 6.7 | 14.0 | 96 | 22.6 | 7.6 | 3.60 |
| DMEA-PO | 0.192 | 0.175 | 23.1 | 1026 | 6.7 | 12.5 | 90 | 22.4 | 7.1 | 3.50 |
| DMEA-PO | 0.192 | 0.190 | 22.7 | 1026 | 6.7 | 12.5 | 90 | 22.2 | 7.0 | 3.50 |
| DMEA-PO | 0.240 | 0.190 | 22.6 | 1022 | 7.1 | 12.0 | 87 | 22.0 | 7.3 | 3.30 |
| DMEA-PO | 0.240 | 0.210 | 22.5 | 1022 | 7.1 | 12.0 | 83 | 21.7 | 5.9 | 3.40 |
| DMEA-PO | 0.240 | 0.230 | 22.3 | 1022 | 7.1 | 12.0 | 81 | 21.3 | 4.3 | 3.60 |
| DMEA-PO | 0.300 | 0.220 | 22.7 | 1020 | 6.9 | 11.5 | 77 | 21.4 | 4.8 | 3.60 |
| DMEA-PO | 0.300 | 0.250 | 22.6 | 1020 | 6.9 | 11.0 | 75 | 21.2 | 3.2 | 3.60 |
| DMEA-PO | 0.300 | 0.280 | 23.1 | 1020 | 6.9 | 11.0 | 72 | 20.8 | 1.6 | 3.70 |
| DMEE-PO | 0.192 | 0.160 | 22.7 | 1026 | 6.7 | 14.0 | 99 | 22.5 | 7.7 | 3.50 |
| DMEE-PO | 0.192 | 0.175 | 22.9 | 1026 | 6.7 | 13.0 | 95 | 22.5 | 7.3 | 3.60 |
| DMEE-PO | 0.192 | 0.190 | 22.7 | 1026 | 6.7 | 13.0 | 93 | 22.4 | 6.7 | 3.70 |
| DMEE-PO | 0.240 | 0.190 | 22.5 | 1023 | 6.9 | 12.5 | 89 | 21.8 | 6.0 | 3.40 |

TABLE 1-continued

| AMINE TYPE | AMINE AMOUNT (pbw) | STANNOUS OCTOATE (pbw) | PREMIX TEMP. (°C.) | ATMOSPHERIC PRESSURE (mbar) | ABS. HUM. (mmHg) | CREAM TIME (SEC) | RISE TIME (SEC) | FOAM DENSITY (kg/m$^3$) | Airflow (scFm) | HARDNESS 40% COMPRESSION (k Pa) |
|---|---|---|---|---|---|---|---|---|---|---|
| DMEE-PO | 0.240 | 0.210 | 22.5 | 1023 | 6.9 | 12.5 | 85 | 21.4 | 5.3 | 3.60 |
| DMEE-PO | 0.240 | 0.230 | 22.4 | 1023 | 6.9 | 12.0 | 83 | 21.4 | 4.2 | 3.60 |
| DMEE-PO | 0.300 | 0.220 | 22.7 | 1020 | 6.9 | 11.5 | 82 | 21.8 | 5.8 | 3.40 |
| DMEE-PO | 0.300 | 0.250 | 22.8 | 1020 | 6.9 | 11.0 | 76 | 21.2 | 3.0 | 3.70 |
| DMEE-PO | 0.300 | 0.280 | 22.7 | 1020 | 6.9 | 11.5 | 74 | 21.1 | 2.2 | 3.60 |

EXAMPLE 3

Using the polyurethane formulation of Example 2, the catalyst system DMEA/Stannous Octoate and DMEA-PO/Stannous Octoate were compared. The foams were prepared under the same conditions of premix temperature (23.2° C.±0.3); barometric pressure (1026 mba) and absolute humidity (6.3 mm Hg). Preparation of DMEA-PO was in accordance with Example 1. The results are presented below in Table 2.

TABLE 2

| AMINE TYPE | AMINE AMOUNT (pbw) | STANNOUS OCTOATE (pbw) | CREAM TIME (SEC) | RISE TIME (SEC) | FOAM DENSITY (kg/m$^3$) | Airflow (scfm) | HARDNESS 40% COMPRESSION (k Pa) |
|---|---|---|---|---|---|---|---|
| DMEA | 0.320 | 0.160 | 10.0 | 95 | 22.4 | 7.5 | 3.60 |
| DMEA | 0.320 | 0.175 | 11.0 | 90 | 22.0 | 7.0 | 3.60 |
| DMEA | 0.320 | 0.190 | 11.5 | 87 | 22.0 | 6.8 | 3.60 |
| DMEA | 0.400 | 0.190 | 11.5 | 84 | 22.0 | 7.0 | 3.50 |
| DMEA | 0.400 | 0.210 | 11.5 | 80 | 21.9 | 6.3 | 3.40 |
| DMEA | 0.400 | 0.230 | 11.0 | 77 | 21.6 | 4.8 | 3.80 |
| DMEA | 0.500 | 0.220 | 10.5 | 73 | 21.9 | 5.8 | 3.60 |
| DMEA | 0.500 | 0.250 | 10.5 | 70 | 21.3 | 4.2 | 3.60 |
| DMEA | 0.500 | 0.280 | 10.0 | 67 | 21.2 | 2.1 | 3.90 |
| DMEA-PO | 0.192 | 0.160 | 13.5 | 97 | 22.1 | 7.8 | 3.50 |
| DMEA-PO | 0.192 | 0.175 | 13.5 | 94 | 21.7 | 7.6 | 3.40 |
| DMEA-PO | 0.192 | 0.190 | 13.0 | 91 | 21.9 | 6.8 | 3.60 |
| DMEA-PO | 0.240 | 0.190 | 12.5 | 88 | 21.6 | 7.5 | 3.40 |
| DMEA-PO | 0.240 | 0.210 | 12.0 | 84 | 21.6 | 6.5 | 3.50 |
| DMEA-PO | 0.240 | 0.230 | 12.0 | 81 | 21.3 | 4.5 | 3.70 |
| DMEA-PO | 0.300 | 0.220 | 11.5 | 78 | 21.4 | 6.0 | 3.40 |
| DMEA-PO | 0.300 | 0.250 | 11.5 | 75 | 21.2 | 4.1 | 3.60 |
| DMEA-PO | 0.300 | 0.280 | 10.5 | 72 | 20.6 | 1.6 | 3.80 |

As the polyurethane catalyst, the propylene oxide adduct of DMEA tended to yield a foam having a slightly lower density (about 1% to 3% lower) than foams prepared using DMEA, when compared at the same level of stannous octoate and rise time. Furthermore, it appears that the cream times of the catalysts of the invention are longer than encountered using DMEA.

EXAMPLE 4

A series of polyurethanes were prepared from an ester polyol (Desmophen 2381M available from Bayer, A. G.) and TDI 80 (tolylene diisocyanate available from Bayer, A. G.) and water. Based on 100 parts by weight of the ester, 95 (index) isocyanate, 3.5 parts water and 1.0 parts of a siloxane surfactant (SE-232 available from BP Chemicals) were used. The cream time and rise time of the formulations were measured and the results are presented below in Table 3.

TABLE 3

| AMINE TYPE | AMINE AMOUNT (pbw) | STANNOUS OCTOATE (pbw) | CREAM TIME (SEC) | RISE TIME (SEC) |
|---|---|---|---|---|
| DMEA-PO | 1.0 | — | 12 | 68 |
| DMEA-PO | 0.8 | — | 15 | 76 |
| DMEA-PO/DM-16D* | 0.53/0.1 | 0.02 | 17.5 | 86 |
| DMEE-PO/DM-16D | 0.61/0.1 | 0.02 | 16.0 | 90 |

*ARMEEN DM-16D (Dimethylhexadecylamine) available from Akzo Chemicals.

While certain specific embodiments of the invention have been described with particularity herein, it will be recognized that various modifications thereof will occur to those skilled in the art, and it is to be understood that such modifications and variations are to be included within the purview of this application and the spirit and scope of the appended claims.

We claim:

1. A process for preparing a polyurethane foam which comprises reacting an organic polyisocyanate, a composition that contains an active hydrogen as measured and determined by the Zerewitinoff method, and water in the presence of a catalytic amount of a dimethylamino alkyleneoxy isopropanol having the formula:

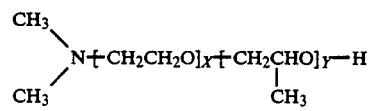

where X is at least 1 and Y is at least 1.

2. A process according to claim 1 wherein said organic polyisocyanate is an aromatic polyisocyanate.

3. The process of claim 2 wherein said aromatic polyisocyanate is selected from the group consisting of 2,4-tolylene diisocyanate, 2,6-tolylene diisocyanate and mixtures thereof.

4. The process of claim 1 wherein X is between 1 and 5 and Y is between 1 and 5.

5. The process of claim 1 wherein X is 1 or 2 and Y is between 1 and 5.

6. The process of claim 5 wherein X is 1 and Y is 1.

7. The process of claim 5 wherein X is 2 and Y is 1.

8. The process of claim 4 wherein said reaction also is conducted in the presence of a catalytic amount of a tin compound.

9. The process of claim 8 wherein said tin compound is a stannous acylate.

10. The process of claim 9 wherein said stannous acylate is stannous octoate.

11. A process for preparing a polyurethane foam which comprises reacting an organic polyisocyanate, a polyol and water in the presence of a catalytic amount of a dimethylamino alkyleneoxy isopropanol having the formula:

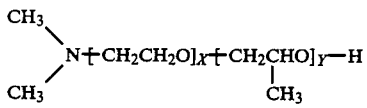

wherein X is at least 1 and Y is at least 1.

12. The process of claim 11 wherein said polyol is an ether polyol.

13. The process of claim 11 wherein said polyol is an ester polyol.

14. A process according to claim 11 wherein said organic polyisocyanate is an aromatic polyisocyanate.

15. The process of claim 14 wherein said aromatic polyisocyanate is selected from the group consisting of 2,4-tolylene diisocyanate, 2,6-tolylene diisocyanate and mixtures thereof.

16. The process of claim 11 wherein X is between 1 and 5 and Y is between 1 and 5.

17. The process of claim 14 wherein X is 1 or 2 and Y is between 1 and 5.

18. The process of claim 17 wherein X is 1 and Y is 1.

19. The process of claim 17 wherein X is 2 and Y is 1.

20. The process of claim 17 wherein said reaction also is conducted in the presence of a catalytic amount of a tin compound.

21. The process of claim 20 wherein said tin compound is a stannous acylate.

22. The process of claim 21 wherein said stannous acylate is stannous octoate.

23. A polyurethane foam produced by the process of claim 1.

24. A polyurethane foam produced by the process of claim 4.

25. A polyurethane foam produced by the process of claim 6.

26. A polyurethane foam produced by the process of claim 7.

27. A polyurethane foam produced by the process of claim 11.

28. A polyurethane foam produced by the process of claim 16.

29. A polyurethane foam produced by the process of claim 18.

30. A polyurethane foam produced by the process of claim 19.

* * * * *